(12) United States Patent
Kunz et al.

(10) Patent No.: US 11,723,756 B2
(45) Date of Patent: Aug. 15, 2023

(54) RECEPTACLE FOR A DENTAL IMPLANT

(71) Applicant: STRAUMANN HOLDING AG, Basel (CH)

(72) Inventors: Marcel Kunz, Basel (CH); Roland Huber, Hägglingen (CH)

(73) Assignee: STRAUMANN HOLDING AG, Basel (CH)

( * ) Notice: Subject to any disclaimer, the term of this patent is extended or adjusted under 35 U.S.C. 154(b) by 279 days.

(21) Appl. No.: 16/956,669

(22) PCT Filed: Dec. 20, 2018

(86) PCT No.: PCT/EP2018/000575
§ 371 (c)(1),
(2) Date: Jun. 22, 2020

(87) PCT Pub. No.: WO2019/120607
PCT Pub. Date: Jun. 27, 2019

(65) Prior Publication Data
US 2020/0315750 A1 Oct. 8, 2020

(30) Foreign Application Priority Data
Dec. 20, 2017 (DE) .................... 20 2017 107 751.9

(51) Int. Cl.
*A61C 8/00* (2006.01)
(52) U.S. Cl.
CPC .................. *A61C 8/0087* (2013.01)
(58) Field of Classification Search
CPC ......... A61C 8/00; A61C 8/0087; A61C 19/02; B65D 25/101; B65D 25/108
See application file for complete search history.

(56) References Cited

U.S. PATENT DOCUMENTS

| 6,217,332 B1 | 4/2001 | Kumar |
| 6,247,932 B1 * | 6/2001 | Sutter .................. A61C 8/0087 |
| | | 433/173 |

(Continued)

FOREIGN PATENT DOCUMENTS

| BR | PI0902546 A2 | 5/2011 |
| CN | 1469726 A | 1/2004 |

(Continued)

OTHER PUBLICATIONS

Jul. 20, 2021 Office Action Issued in Chinese Patent Application No. 201880086603.4.

(Continued)

*Primary Examiner* — Heidi M Eide
*Assistant Examiner* — Lina Faraj
(74) *Attorney, Agent, or Firm* — Oliff PLC

(57) ABSTRACT

A receptacle for a dental implant includes a cover with a first end section which is open to the outside and a second end section which is closed to the outside. The cover surrounds an interior space which is open to the first end section and in which a holder is arranged. The holder has a channel that is open to the outside and is formed to hold an implant extension during transport. The receptacle has a tubular bottom receptacle including an outer third end section and an opposing fourth end section. Three spring arms are arranged in the cover at an outer first end. The spring arms are so designed that the nubs thereof are pushed away during insertion of the implant extension and, in the final position, push into the groove with a tensioning force.

12 Claims, 8 Drawing Sheets

(56) References Cited

U.S. PATENT DOCUMENTS

| | | | |
|---|---|---|---|
| 6,261,097 B1 | 7/2001 | Schmutz et al. | |
| 6,280,192 B1* | 8/2001 | Groll | A61C 8/0087 206/63.5 |
| 7,694,812 B2* | 4/2010 | Bammerlin | A61C 8/0087 206/63.5 |
| 8,827,702 B2* | 9/2014 | Mamraev | A61C 8/0087 433/163 |
| 2004/0180308 A1* | 9/2004 | Ebi | A61C 8/0069 433/173 |
| 2007/0193905 A1 | 8/2007 | Jemelin et al. | |
| 2011/0017622 A1* | 1/2011 | Guenter | A61C 8/0087 206/63.5 |
| 2011/0247947 A1* | 10/2011 | Nihei | A61C 8/0087 206/63.5 |
| 2012/0052462 A1* | 3/2012 | Mundwiler | A61C 8/0087 433/163 |
| 2012/0329009 A1* | 12/2012 | Nedjat | A61C 8/006 433/174 |
| 2013/0230825 A1 | 9/2013 | Kenk et al. | |
| 2014/0127645 A1* | 5/2014 | Goldenberg | A61B 17/86 606/301 |
| 2014/0141387 A1* | 5/2014 | Kikuchi | A61C 13/235 206/63.5 |
| 2014/0166508 A1* | 6/2014 | Richard | A61C 8/0087 206/63.5 |
| 2014/0202892 A1* | 7/2014 | Thome | A61C 8/0087 206/63.5 |
| 2020/0000559 A1* | 1/2020 | Chung | A61C 8/0087 |
| 2020/0275999 A1* | 9/2020 | Chelminski | A61C 8/008 |

FOREIGN PATENT DOCUMENTS

| | | | |
|---|---|---|---|
| CN | 1520787 A | * | 8/2004 |
| CN | 101966103 A | | 2/2011 |
| CN | 102009790 A | | 4/2011 |
| CN | 102056566 A | | 5/2011 |
| CN | 203001158 U | | 6/2013 |
| CN | 103826567 A | | 5/2014 |
| DE | 29702136 U1 | | 6/1998 |
| EP | 0 963 738 A1 | | 12/1999 |
| EP | 1 523 954 A1 | | 4/2005 |
| EP | 2 279 710 A1 | | 2/2011 |
| EP | 2 279 708 B1 | | 5/2013 |
| KR | 20030089728 A | * | 11/2003 |
| KR | 100699071 B1 | * | 3/2007 |
| KR | 102267375 B1 | * | 6/2021 |
| TW | 201717856 A | | 6/2017 |
| WO | 00/02496 A1 | | 1/2000 |

OTHER PUBLICATIONS

Mar. 7, 2019 International Search Report issued in International Patent Application No. PCT/EP2018/000575.

Jun. 23, 2020 International Preliminary Reporton Patentability issued in International Patent Application No. PCT/EP2018/000575.

* cited by examiner

RECEPTACLE FOR A DENTAL IMPLANT

The present invention relates to a receptacle for a dental implant according to the preamble of claim 1.

Known receptacles for dental implants are designed in such a way that the respective dental implant can be removed in such a way that it is possibly not touched. Ideally, the receptacles allow for easy sterilization and/or storage under inert gas or in a liquid.

EP2279708B1 discloses a receptacle with an adapter in which the dental implant is clamped and with which the dental implant can be removed from the receptacle and then taken out of the adapter. A safe insertion and removal of a dental implant into and from the receptacle is very difficult to achieve with a dental implant having an apical-side implant extension with a predetermined breaking point to the dental implant in order to break off the dental implant from the implant extension when it is removed from the receptacle.

EP0963738A1 discloses a receptacle for a dental implant having an apical-side implant extension, the implant extension being fixedly connected to a head piece of the receptacle. The head piece of the receptacle is bonded to the implant extension, for example, to enable the implant to be broken off the head piece. However, gluing the dental implant to the head piece is considered problematic, as adhesive could get onto the dental implant or into the liquid when stored in liquid.

The object of the invention, in order to remove the disadvantages arising from the prior art, therefore consists in providing a receptacle for a dental implant, which has an apical-side implant extension with a predetermined breaking point to the dental implant, wherein the receptacle being formed in such a way that the implant extension can be inserted therein as safely as possible without contaminating the implant, and with which the dental implant can be separated from the implant extension as safely as possible by means of a rotary and/or buckling movement without damaging the dental implant. The receptacle should also allow easy sterilization and/or storage under inert gas or in a liquid.

The above object is solved by a receptacle according to the features of independent claim 1. Other advantageous embodiments of the invention are set forth in the dependent claims.

According to the invention, a receptacle is provided for a dental implant having an implant extension, the receptacle comprising:

a) a cover which is formed along a longitudinal axis with a first end section which is open to the outside in the direction of the longitudinal axis and with a second end section which is closed to the outside, wherein the cover surrounds an interior space which is open to the first end section in which a holder is arranged along the longitudinal axis, the holder having a channel which is open to the outside along the longitudinal axis, the channel being formed such as to partially receive the implant or implant extension and to hold it during transport; and b) a bottom receptacle formed tubularly along the longitudinal axis with an outer third end section and an opposing fourth end section, the third end section being sealed tightly to the outside, c) wherein the fourth end section of the bottom receptacle and the first end section of the cover are formed to be interconnectable and manually detachable to form a substantially sealed space therebetween;

d) wherein at least three spring arms are formed and arranged in the cover towards the longitudinal axis in such a way that they are each connected to the cover at an outer first end along an annular region around the longitudinal axis and are equally spaced and resilient radially towards the longitudinal axis with a respective opposing second end, e) wherein the second ends towards the longitudinal axis each having a nub formed to engage a groove formed annularly on the implant extension when the implant extension is in its final position; and f) wherein the spring arms are designed geometrically and so flexible that the nubs are pushed away from the longitudinal axis during insertion of the implant extension and, in the final position, push into the groove with a clamping force perpendicular to the longitudinal axis.

Inasmuch as the at least three spring arms are formed in such a way in the channel, in which the implant extension is located with the groove in the connected case, that they push into the groove towards the longitudinal axis and the implant extension, on one hand the dental implant can be held well in the channel. On the other hand, the implant extension and thus the dental implant can be easily and safely inserted into the channel, for example with an increasing axial force until the spring arms snap into the groove of the implant extension. The tension of the spring arms allows the dental implant to be held securely in the channel, so that it can then be safely separated from the cover or the implant extension in the cover by a rotary and/or buckling movement when the dental implant is removed. In addition, the implant extension is held in the cover or prevented from falling out of the cover after the implant has been separated from the implant. The respective spring arm can generally also be called a holding element.

Preferably and advantageously, the holder can be connected to the cover in a rotationally fixed manner around the longitudinal axis by the channel having along the longitudinal axis at least in sections an anti-rotation section or splined hub section which is designed to form a rotationally fixed connection with an implant anti-rotation section or splined shaft section of the implant extension in the final position. In this way, the implant extension can be inserted into the cover, for example, with a small axial force which has to be opposed to the spring tension force of the spring arms in order to push them laterally away, and a rotationally stable connection is thereby created which is designed to twist off the dental implant, for example. In this way, the dental implant can be inserted into the cover with the small axial force and withstand a much greater rotational force than that necessary to twist the dental implant off the implant attachment. It is preferable that the implant extension can only be pulled out of the cover with a much greater force than inserting it.

Preferably and advantageously, the anti-rotation section or splined hub section has greater torsional stability to hold the implant anti-rotation section or splined hub section of the implant extension than is necessary to break off the implant from the implant extension by rotating it around the longitudinal axis. The torsional stability between the anti-rotation section or splined hub section of the holder and the implant anti-rotation section or splined hub section of the implant extension is selected to ensure that the implant is held securely during transport and storage. For example, the torsional stability is greater than 25 Ncm or greater than 20 Ncm, preferably greater than 10 Ncm and particularly preferably greater than 5 Ncm. In a well-known manner, the lower torque force required to separate the implant from the implant appendix is selected in such a way that the security of the connection between the implant and the implant appendix during transport and storage is ensured and, at the same time, no damage to the implant or its adapter occurs when the implant is separated.

Preferably and advantageously, the holder is formed as a bushing separate from the cover, which has a plug connection towards the cover, which can be pushed into one another with the cover along the longitudinal axis and thereby forms a rotationally fixed connection.

Preferably and advantageously, the plug connection between the holder and the cover comprises a separate intermediate connecting element which is formed along the longitudinal axis in such a way that, when the two are plugged together along the longitudinal axis, a rotationally fixed connection to the holder is formed at one end section and a rotationally fixed connection to the cover is formed at an opposing end section.

Preferably and advantageously, the at least three spring arms are formed in one piece as a clip element which is formed around the longitudinal axis, the clip element being connectable to the cover in the direction of the longitudinal axis and then being connected to each other in a tension-resistant manner.

Preferably and advantageously, the cover, the holder and the clip element are designed in such a way that in the interior space of the cover, first the holder is inserted into the cover and then the clip element is placed onto the holder and connected to each other.

Preferably and advantageously the cover, the intermediate connecting element, the holder and the clip element are designed in such a way that in the interior space of the cover, first the intermediate connecting element is inserted into the cover, then the holder is placed onto the intermediate connecting element and then the clip element is placed onto the holder and are connected to each other.

Preferably and advantageously, the clip element is designed to form a direct connection with the cover, the clip element thereby fixing the holder in the cover along the longitudinal axis.

Preferably and advantageously, the clip element is made of a more flexible material or with a more flexible geometry than the holder.

Preferably and advantageously, the second end section has a non-circular grip surface on the outside, so that the cover can be manually held and rotated on it in a non-slip manner in order to allow to release it from the bottom receptacle.

Preferably and advantageously, the channel in the holder for holding the implant extension is designed to be at least so stable that it withstands at least one bending moment by the implant extension in the final position, which occurs when the implant breaks away from the implant extension by a bending break-off.

Preferably and advantageously, the receptacle is made of plastic, wherein a cyclic olefin copolymer or another gas- and liquid-tight plastic for the bottom receptacle part and a low-density polyethylene for the cover is preferred. Further details indications of the materials that can be used and which are preferred are given in EP1523954A1 (the contents of which are hereby inserted), in particular in paragraphs [0018] to [0024].

Preferably and advantageously, the implant consists of a biocompatible material, such as ceramics or, particularly preferred, titanium or a titanium alloy.

Preferred embodiments according to the present invention are illustrated in the following drawings and in a detailed description, but they are not intended to limit the present invention exclusively to these embodiments.

DETAILED DESCRIPTION OF EXEMPLARY EMBODIMENTS

Figure 1A:
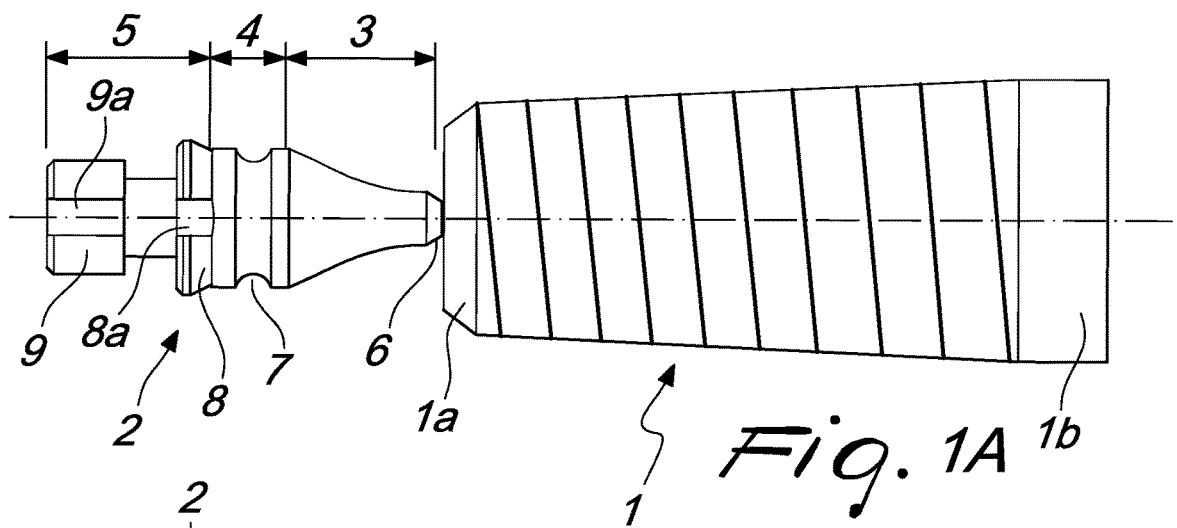
FIGS. 1A and 1B show a dental implant in a side view (FIG. 1A) and in a sectional side view (FIG. 1B), said dental implant having an implant extension at an apical end.
Figure 1B:
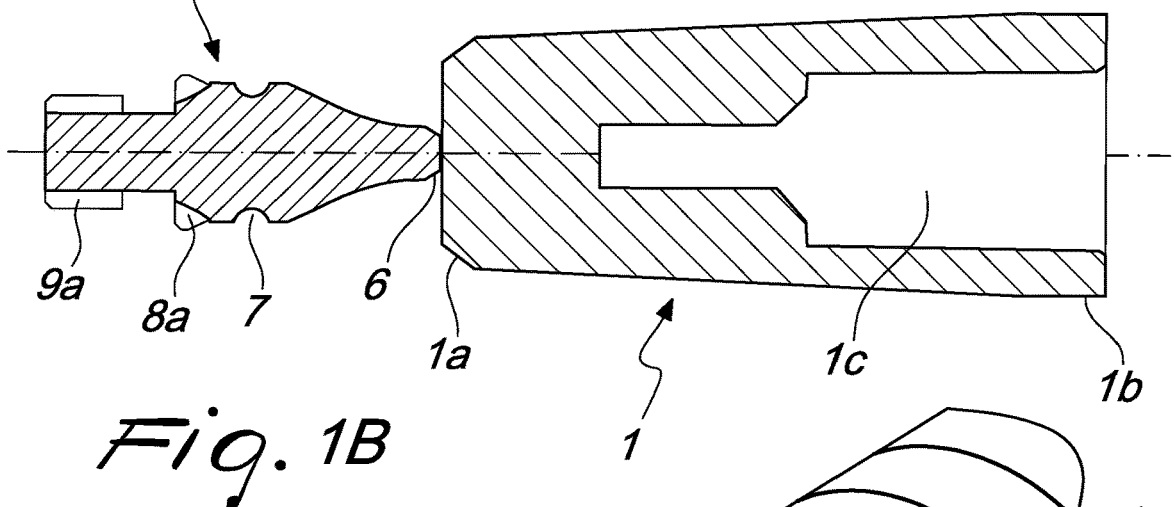
Figure 2:
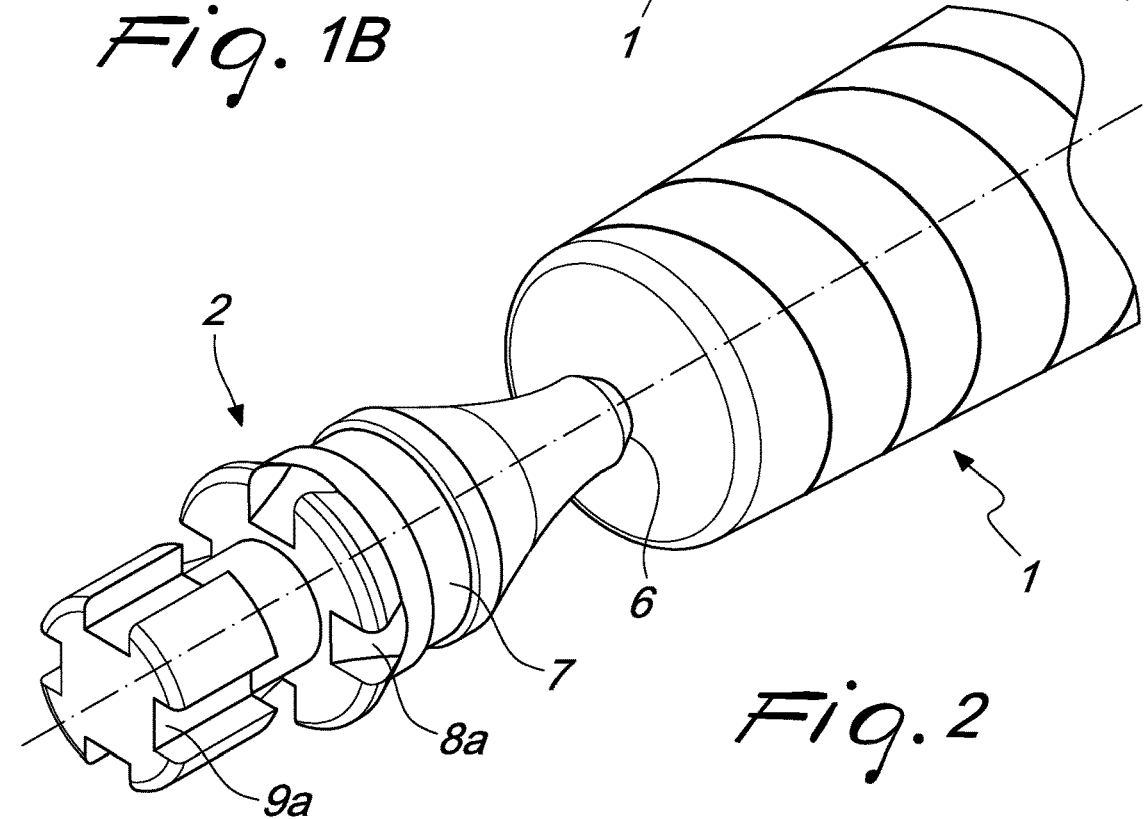
FIG. 2 shows the dental implant of FIG. 1 in a perspective view.
Figure 3A:
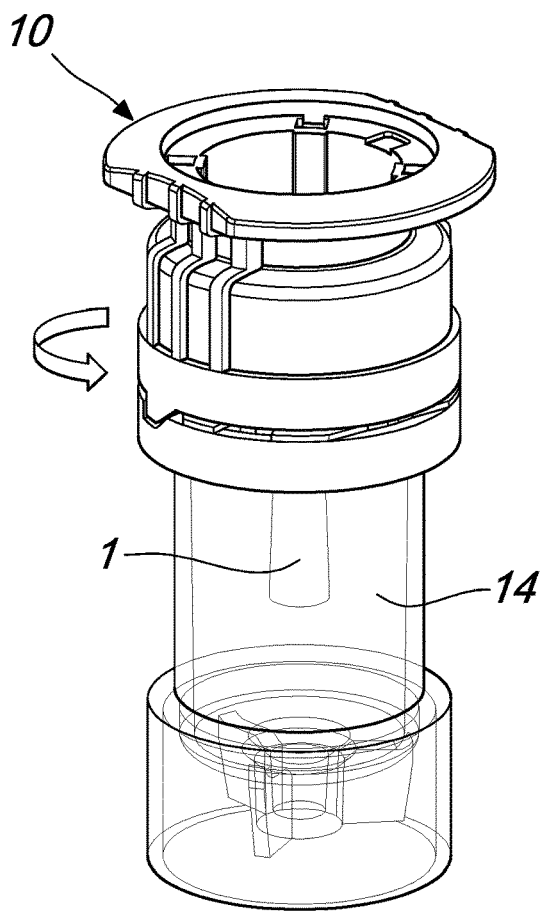
FIGS. 3A-3C show three perspective views of a receptacle consisting of a bottom receptacle part with a cover, wherein in FIG. 3A, the cover is shown connected to the bottom receptacle part, in FIG. 3B, only the bottom receptacle part is shown open, and in FIG. 3C, only the cover with the dental implant inserted therein is shown.
Figure 3B:
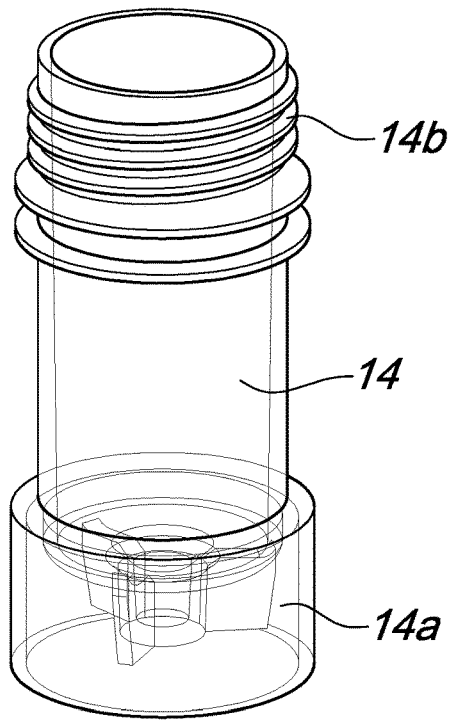
Figure 3C:
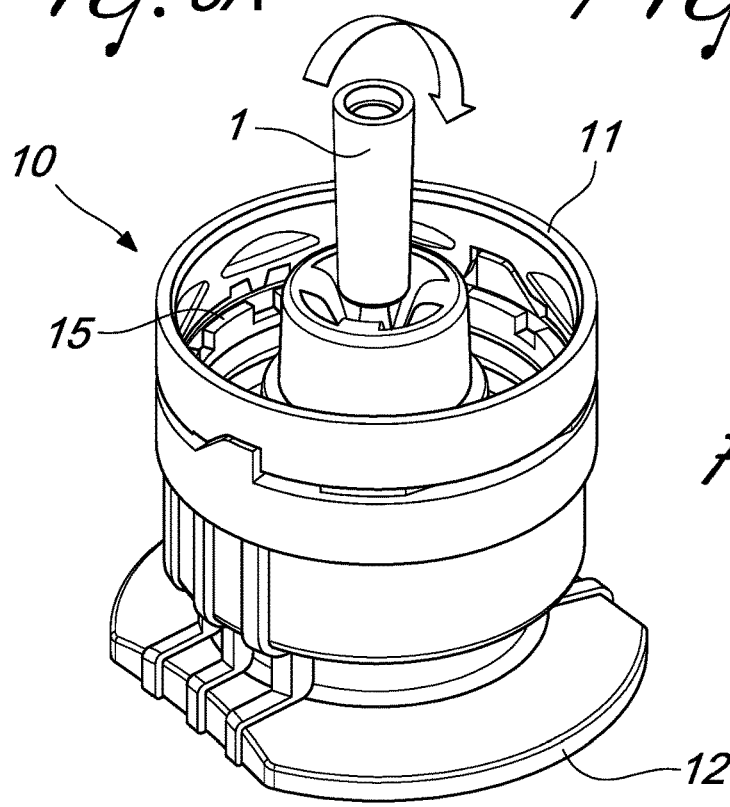

FIGS. 1A, 1B, and 2 show an exemplary embodiment of a dental implant 1 with an implant extension 2, which is formed along a longitudinal axis. A receptacle for holding and transporting the dental implant 1 formed with the implant extension 2 shall be provided.

The dental implant 1 comprises an apical end 1a, a coronal end 1b and a section 1c for receiving and securing an abutment, which also forms an adapter connection to a suitable tool. The implant extension 2 is connected as one piece to the implant 1 and extends from one end of the apical end 1a along the longitudinal axis, like an appendix. Along the longitudinal axis, the implant extension 2 has a first section 3 with an annular constriction 6, which is directly connected to the end face of the apical end 1a of the implant 1 and is designed as a predetermined breaking point having such a small material diameter that, in the event of bending or torsion of the implant 1 against the implant extension 2, the implant 1 can be separated from the implant extension 2 at the constriction 6. According to the invention, the term "separable" includes any kind of separation, such as by breaking off or twisting off. Following the first section 3 along the longitudinal axis, the implant extension 2 has a second section 4 which is further away from the implant 1 than the first section 3 and has an outer annular groove 7 perpendicular to the longitudinal axis, which is designed to be able to hold the implant extension 2 by clamping the groove 7 in the direction of the longitudinal axis.

Along the longitudinal axis following the first section 3 and the second section 4, which is further away from the implant 1 than the first section 3, the implant extension 2 advantageously may have an implant anti-rotation section or splined shaft section 5, which is designed to be able to hold the implant extension 2 stable and safe against rotation. For this purpose, in a coronal section of the implant anti-rotation section or splined shaft section 5, as shown, preferably around the longitudinal axis, circular segment-like first wedges 8 are formed, which are formed by first hubs 8*a* in between. Preferably also on an apical outer section of the implant anti-rotation section or splined shaft section 5, as shown, second wedges 9 are designed in the form of circular segments around the longitudinal axis, which are formed by second hubs 9*a* in between. The geometries of the implant anti-rotation lock section or splined shaft section 5 shown as examples represent a possibility of achieving sufficient stability and twist resistance for separating the implant with a low total volume of the splined shaft section 5. At this point it should be noted that the term splined shaft section refers to a general implant anti-rotation section which can be achieved both by one or more so-called splined shafts or splinted hubs and by another not rotationally symmetrical cross-section. For example, the cross-section of the implant anti-rotation section can be square or rectangular or polygonal or star-shaped.

Preferably, the material diameter of the constriction 6 is formed in such a way that the constriction 6 breaks at a torsion of less than 25 Ncm or less than 20 Ncm or, more preferably, less than 10 Ncm or, even more preferably, less than 5 Ncm. Preferably, the dental implant 1 has threads between the apical end 1*a* and the coronal end 1*b* for screwing the dental implant 1 into a bone.

FIGS. 3A-8 show an exemplary embodiment of the receptacle and preferred parts thereof, which are suitable for holding and transporting the dental implant 1. If possible, the receptacle should be formed in such a way that the dental implant 1 with its implant extension 2 can be inserted, held and transported safely and easily without falling down or kinking. The dental implant 1 is inserted into a cover 10 and locked in it. It should also be possible to open the receptacle easily and remove the dental implant 1 out of it.

The receptacle for the dental implant 1 having the implant extension 2, according to the invention, comprises the following:

a) a cover 10 which is formed along a longitudinal axis with a first end section 11 which is open to the outside in the direction of the longitudinal axis and with a second end section 12 which is closed to the outside. The cover 10 surrounds an interior space 15 which is open to the first end section 11 and in which a holder 20 is arranged along the longitudinal axis, said holder having a channel which is open to the outside along the longitudinal axis, the channel being formed to at least partially receive the implant extension 2 and thus to hold the dental implant 1 during transport;

b) a bottom receptacle 14 formed tubularly along the longitudinal axis with an outer third end section 14*a* and an opposing fourth end section 14*b*, the third end section 14*a* being tightly sealed to the outside;

c) wherein the fourth end section 14*b* of the bottom receptacle 14 and the first end section 11 of the cover 10 are interconnectable and manually detachable to form therebetween a substantially gas- and liquid-tight space in which the dental implant 1 is located;

d) wherein at least three spring arms 31 are formed and arranged in the cover 10 towards the longitudinal axis in such a way that they are each connected to the cover 10 at an outer first end 31*a* along an annular region around the longitudinal axis and are equally spaced and resilient radially towards the longitudinal axis with a respective opposing second end 31*b*;

e) wherein said second ends 31*b* towards the longitudinal axis each having a nub 32 formed to engage a groove 7 formed annular on the implant extension 2 when the implant extension 2 is in its final position; and f) wherein the spring arms 31 are designed geometrically and so flexible that the nubs 32 are pushed away from the longitudinal axis during insertion of the implant extension 2 and, in the final position, push into the groove 7 with a clamping force perpendicular to the longitudinal axis.

The holder 20 is preferably connected to the cover 10 in a rotationally fixed manner around the longitudinal axis, and the channel has an anti-rotation section or splined hub section along the longitudinal axis at least in sections and is designed to form a rotationally fixed connection with a splined shaft section of the implant extension 2 in the final position. It should be noted at this point that the term splined hub section refers to a general anti-rotation section which can be achieved both by one or more so-called splined shafts or splinted hubs and by another not rotationally symmetrical cross-section which corresponds in a complementary manner to the respective cross-section of the dental implant 1. For example, the cross-section of the anti-rotation section can be square or rectangular or polygonal or star-shaped.

Preferably, the anti-rotation section or splined hub section has greater torsional stability to hold the implant anti-rotation section or splined hub section of the implant extension 2 than is necessary to break off the implant 1 from the implant extension 2 by rotational movement around the longitudinal axis.

Figure 6A:
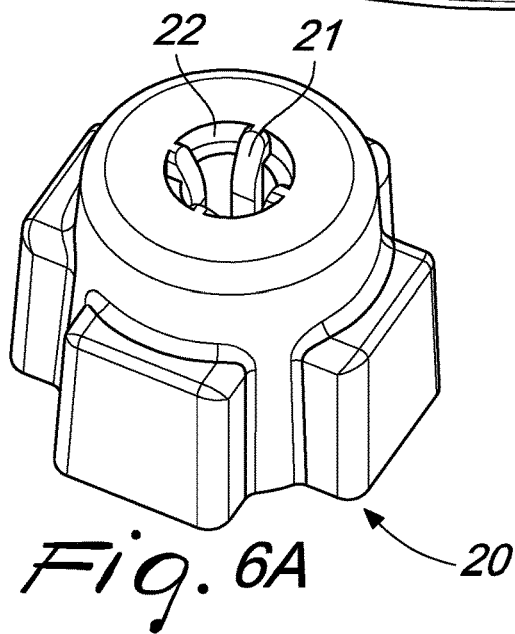
FIGS. 6A and 6B show the holder of the cover for the dental implant, in a perspective view (FIG. 6A) and in a sectional side view (FIG. 6B)
Figure 6B:
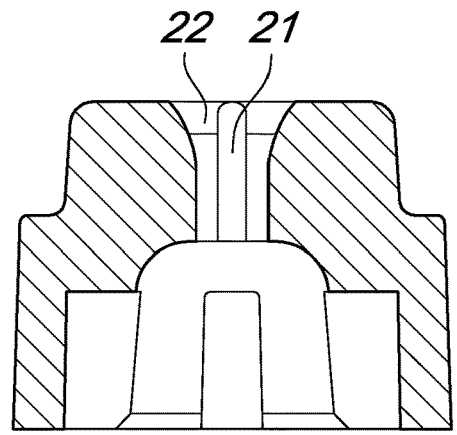

As exemplary shown in FIGS. 6A and 6B, the holder 20 preferably has a splined hub section which is complementary to the splined shaft section 5 of the implant extension 2, wherein third hubs 22 of the holder 20 at least match the first wedges 8 of the implant extension 2 and third wedges 21 of the holder 20 at least match the first hubs 8*a* of the implant extension 2, wherein, however, preferably third hubs 22 of the holder 20 match the first wedges 8 and the second wedges 9 of the implant extension 2 and third wedges 21 of the holder 20 match the first hubs 8*a* and the second hubs 9*a* of the implant extension 2 in order to establish a stable, rotationally stable connection.

Preferably, the torsional stability between the splined hub section of the holder 20 and the splined shaft section of the implant extension 2 is greater than 25 Ncm or greater than 20 Ncm, preferably greater than 10 Ncm and particularly preferably greater than 5 Ncm, to ensure that the dental implant 1 can be safely twisted off the implant extension 2 and cover 10.

Figure 4:
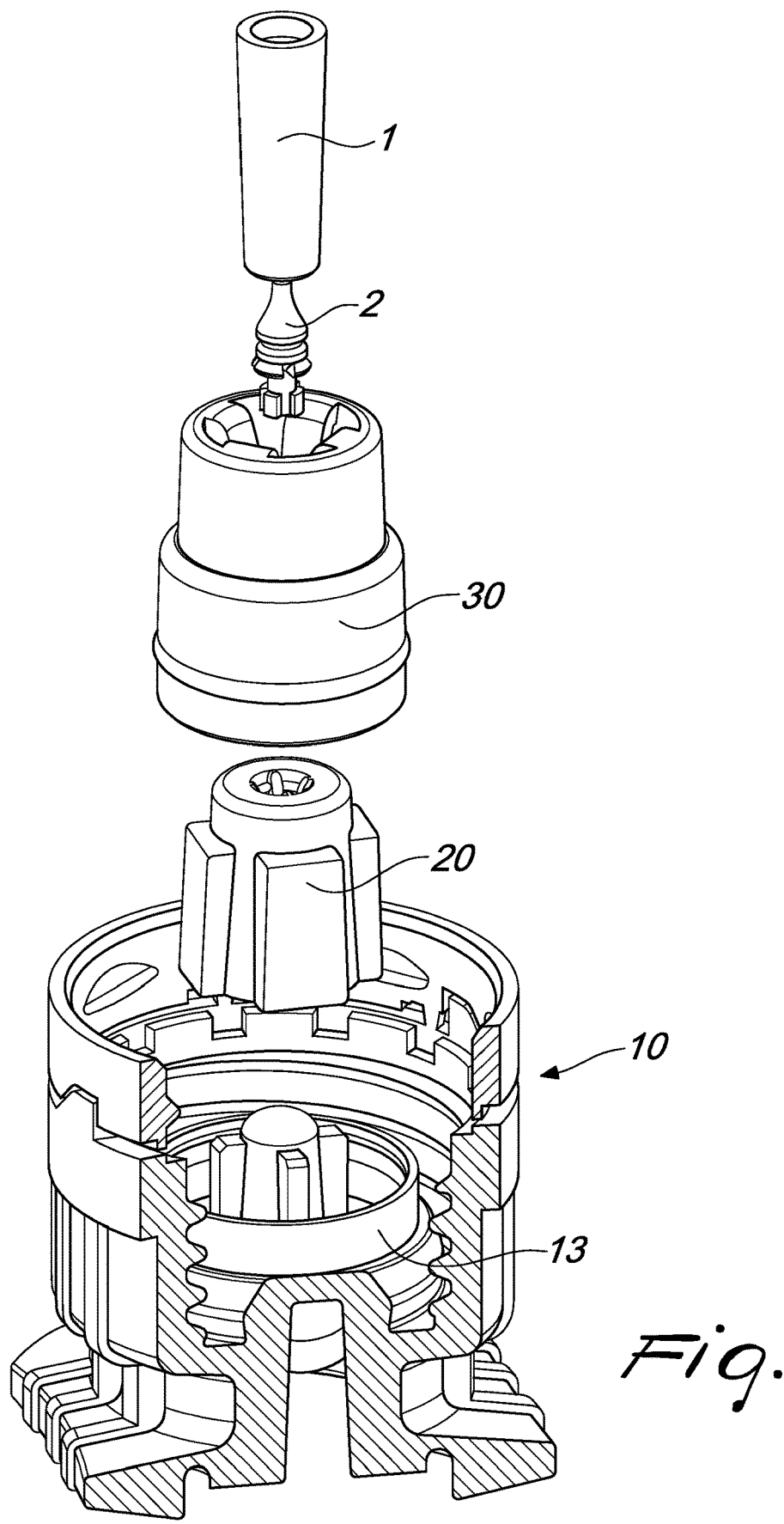
FIG. 4 shows the cover of FIG. 3 with an intermediate connecting element, a holder, a clip element as its components and the dental implant in a perspective exploded view.
Figure 5:
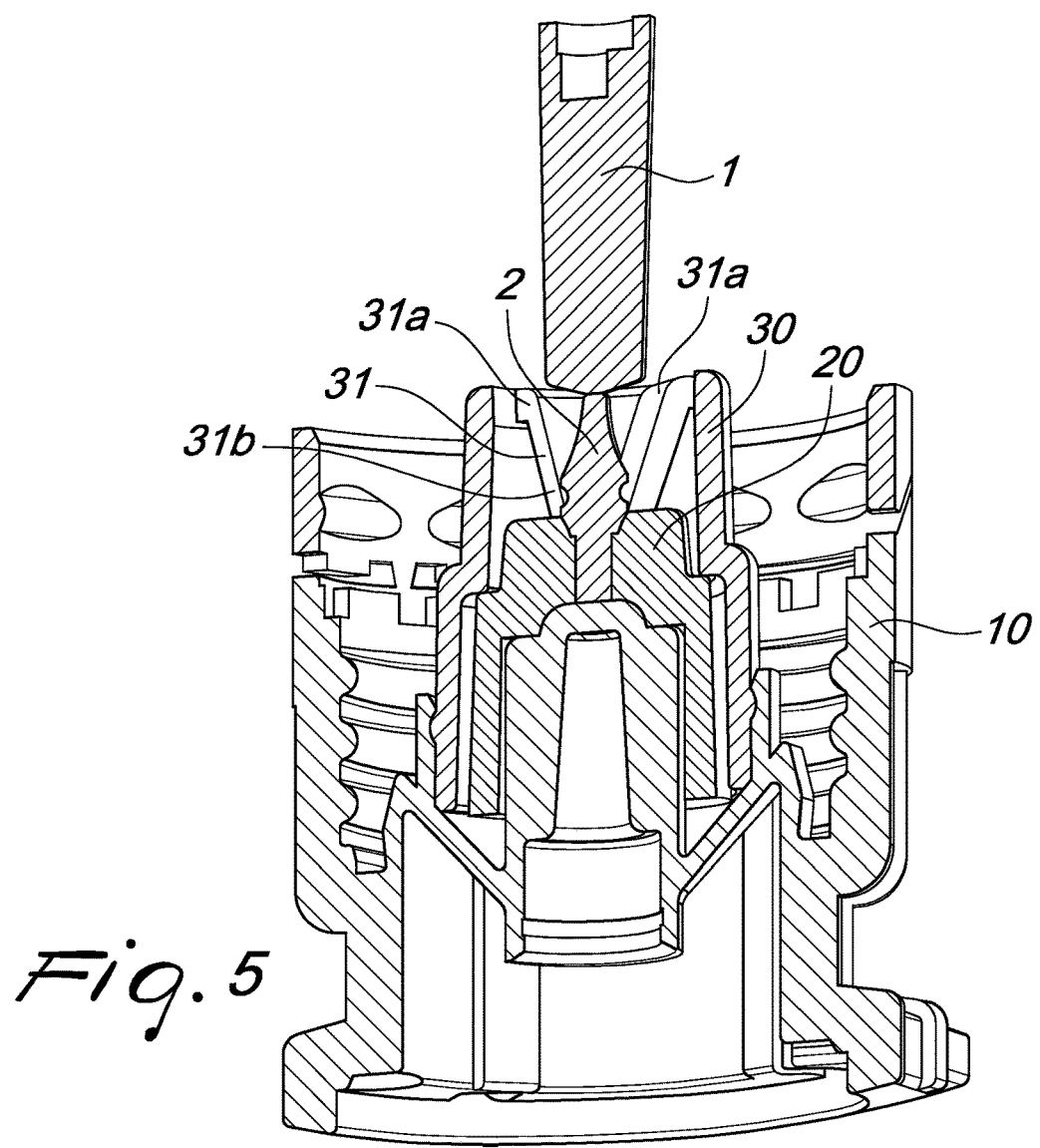
FIG. 5 shows the cover with the dental implant inserted in it in a sectional side view.

Preferably, the holder 20 is connected as one piece with the cover 10. Alternatively, the holder 20 is connected to the cover 10 in two pieces or via at least one intermediate connecting element 13. Preferably, the holder 20 is formed as a bushing separate from the cover 10, which has a plug connection towards the cover 10, which can be pushed into one another along the longitudinal axis with the cover 10 and thereby forms a rotationally fixed connection. Preferably, the rotationally fixed connection between the holder 20 and the cover 10 is formed by a further splined shaft connection and/or by a toothed connection. FIG. 4 shows a preferred embodiment of the holder 20, which has splined shaft or toothed connecting elements on the outside in an annular shape, the cover or the intermediate connecting element 13 then having complementary splined hub or toothed connecting elements to match. Alternatively, the holder 20 could also have an inwardly directed splined hub or toothed connection which communicates with a complementary splined shaft or toothed connection of the cover or the intermediate connecting element 13. Similarly, as an alternative to or in addition to one of the above-mentioned splined shaft-splined hub connection, the holder 20 may also have, on its underside facing the cover, a tooth connection which communicates with a complementary tooth connection which the cover 10 or the intermediate connecting element 13 has.

Preferably, the plug connection has a torsional stability that is higher than the torsional stability of the connection between the splined hub section of the holder 20 and the splined shaft section of the implant extension 2.

Figure 9:
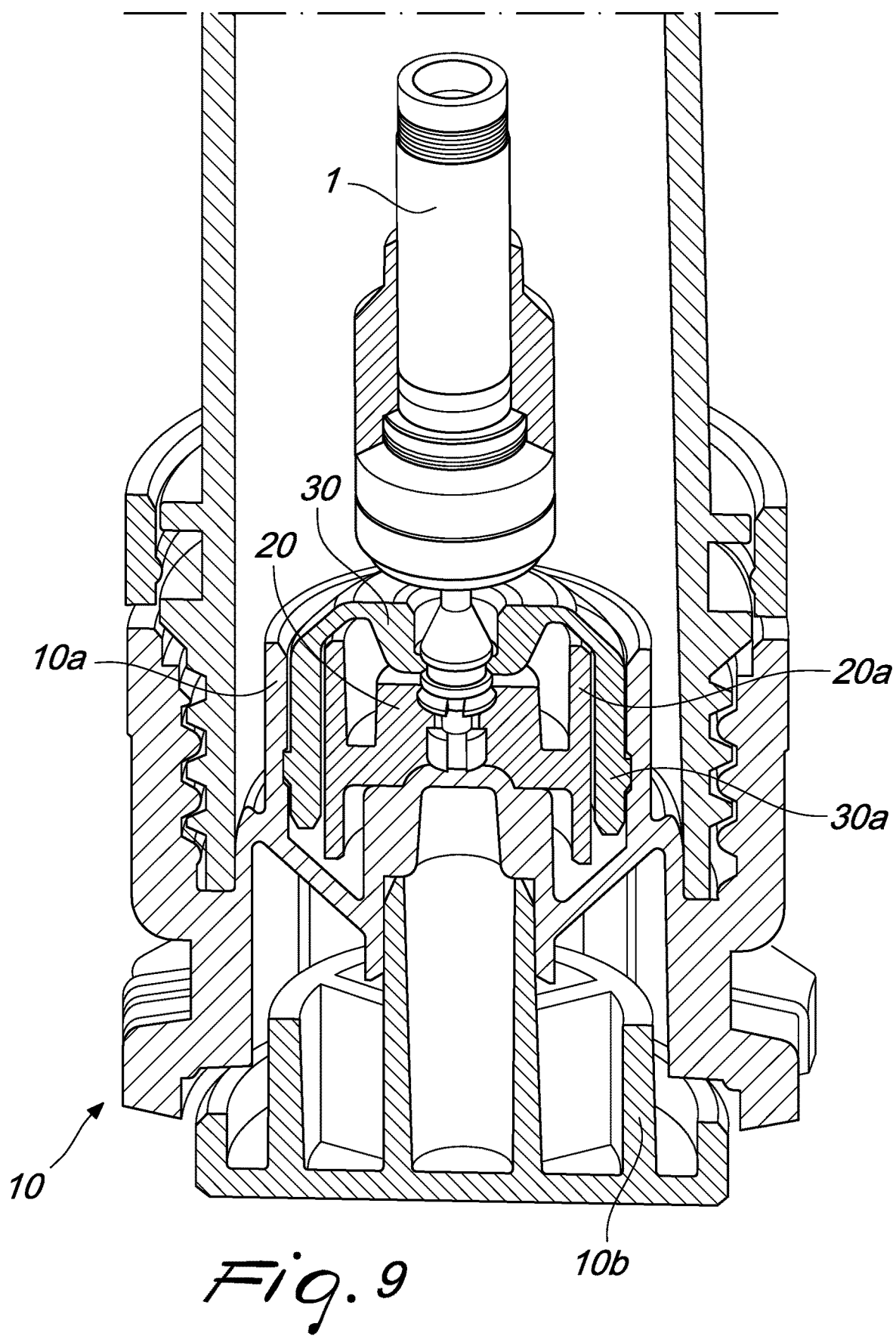
FIG. 9 shows another embodiment of the cover with other embodiments of the holder and the clip element holding the dental implant, illustrating a part of the bottom receptacle part connected to the cover, in a perspective sectional view.
Figure 10A:
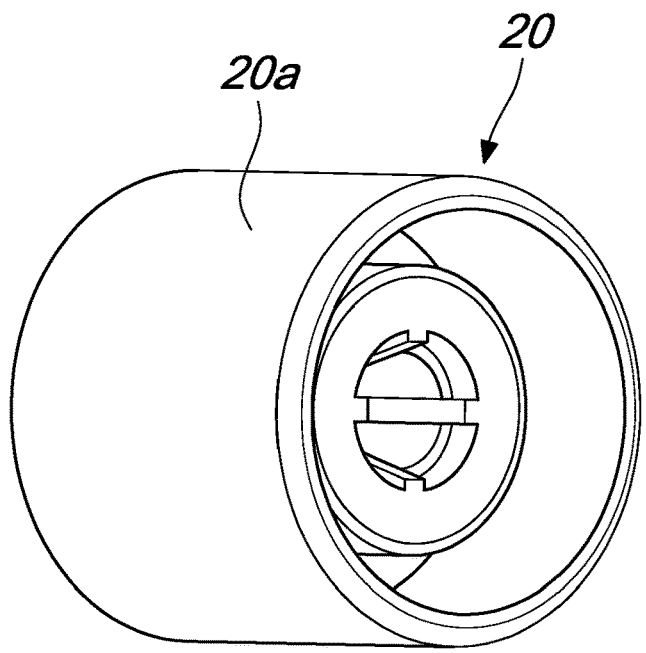
FIGS. 10A and 10B show a perspective view (FIG. 10A) and a sectional view (FIG. 10B) of the other embodiment of the holder according to FIG. 9.
Figure 10B:
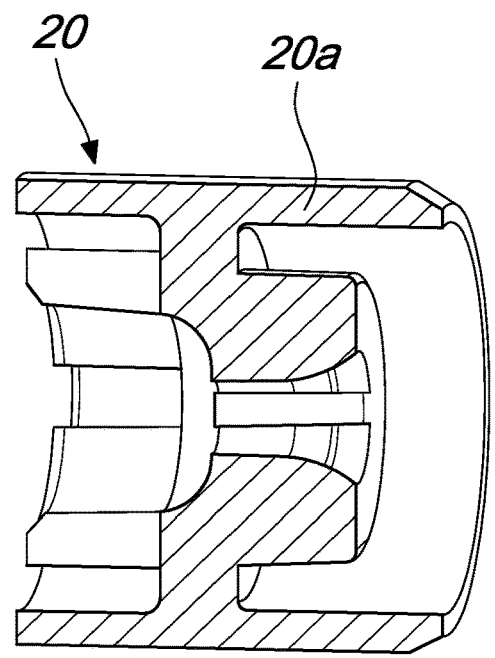
Figure 11A:
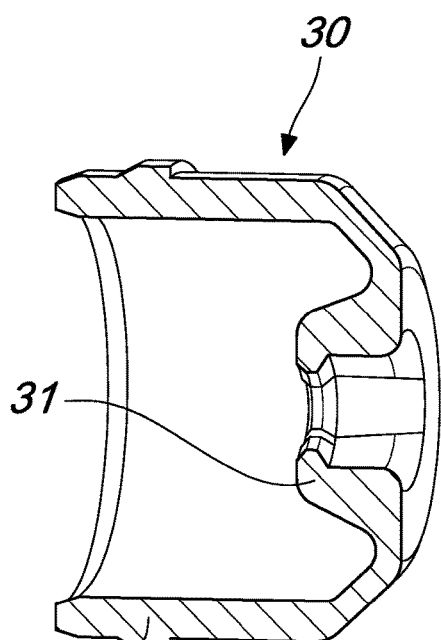
FIGS. 11A-11D show a sectional view (FIGS. 11A and 11C) and a perspective view (FIGS. 11B and 11D) of the other embodiment of the clip element according to FIG. 9.
Figure 11B:
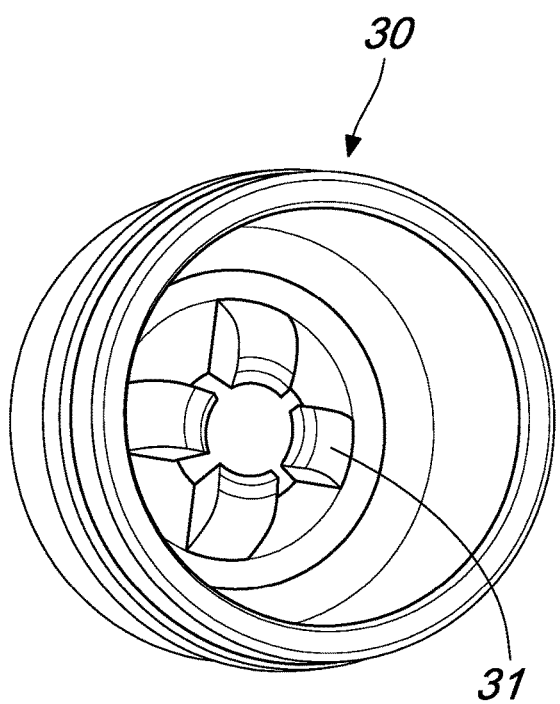
Figure 11C:
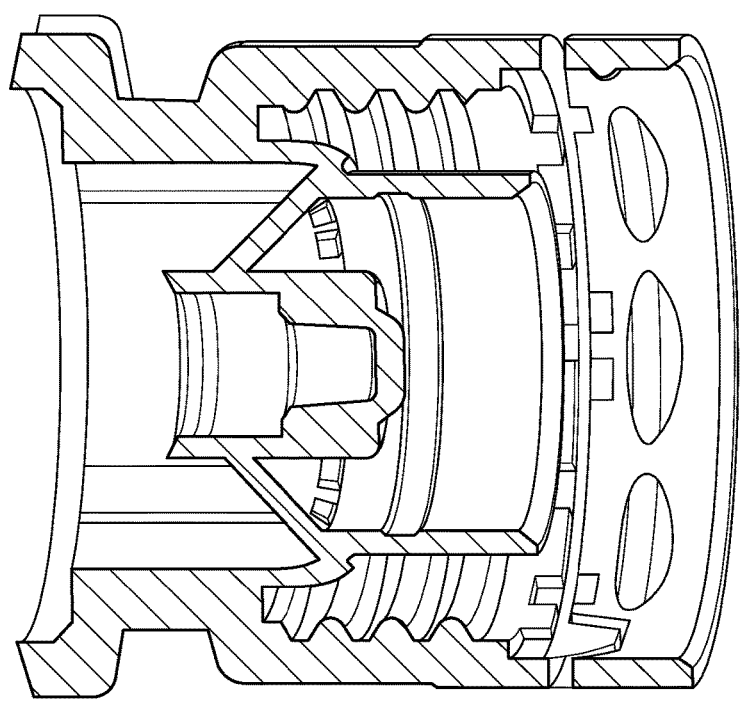
Figure 11D:
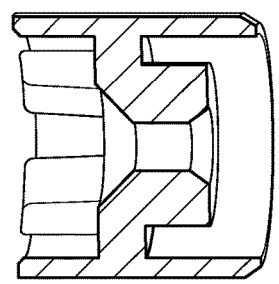

The cover 10 preferably has stiffeners in material recess regions, as shown for instance in FIG. 9, which increase stability.

The plug connection between the holder 20 and the cover 10 preferably comprises the separate intermediate connecting element 13, which is formed along the longitudinal axis in such a way that when they are plugged into each other along the longitudinal axis, a rotationally fixed connection to the holder 20 is formed at one end section and a rotationally fixed connection to the cover 10 is formed at an opposing end section. The intermediate connecting element 13 can have an adapter function, for example, in order to be able to connect different holders 20, which match a respective dental implant 1, to the cover 10. FIG. 4 shows such an intermediate connecting element 13, which is arranged between the cover 10 and the holder 20 and connects them. The connection via the intermediate connecting element 13 is preferably a rotationally fixed connection and/or preferably a tension-resistant connection. Preferably, the intermediate connecting element 13 can also be formed elastically in order to absorb shocks in the longitudinal direction along the longitudinal axis.

Figure 7A:
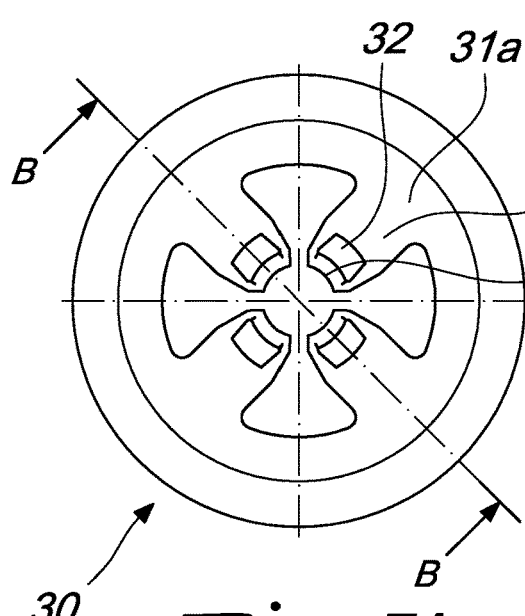
FIGS. 7A and 7B show the clip element of the cover for the dental implant, in a top view (FIG. 7A) and in a sectional side view (FIG. 7B)
Figure 7B:
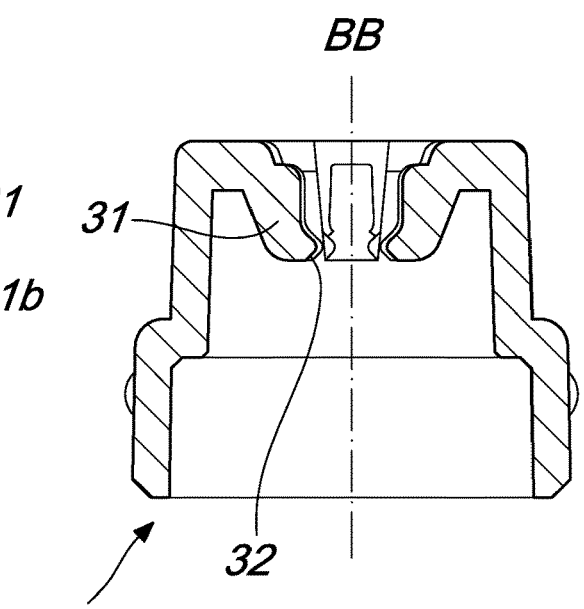
Figure 8:
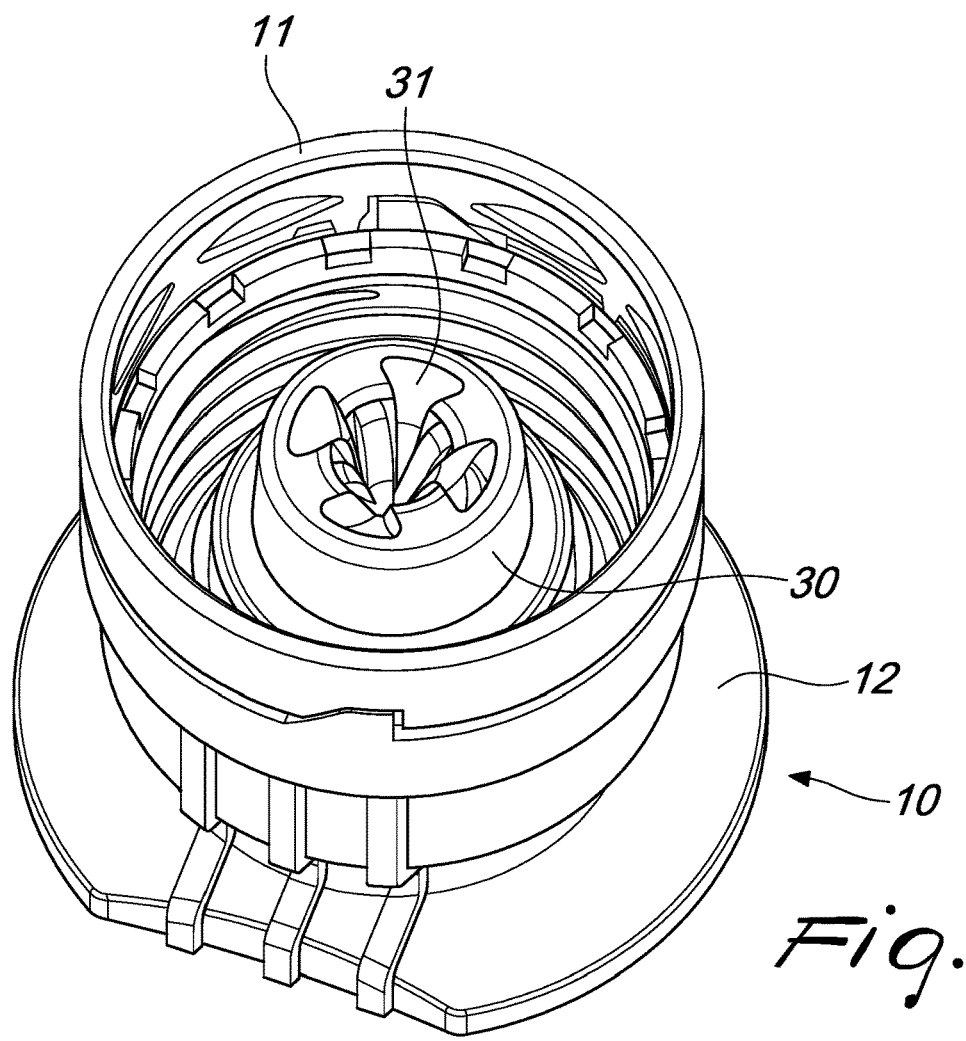
FIG. 8 shows the cover with its components from the inside in a perspective view.

Preferably, the at least three spring arms 31 are formed in one piece as a clip element 30, which is formed around the longitudinal axis, as shown in FIGS. 7A and 7B, for example. Particularly preferably, four spring arms 31 are formed in one piece as one clip element 30, which is formed around the longitudinal axis, as shown in FIGS. 7A and 7B, for example. The clip element 30 can be connected to the cover in the direction of the longitudinal axis in order to be connected to the cover 10 in a tension-resistant manner in an inserted, pushed on, latched and/or screwed state. In other words, the clip element 30 is preferably designed to form a direct connection with the cover 10, wherein the clip element 30 thereby fixes the holder 20 in the cover along the longitudinal axis.

Preferably the cover 10, the holder 20 and the clip element 30 are formed in such a way that in the interior space 15 of the cover 10, first the holder 20 is inserted into the cover 10 and then the clip element 30 is placed onto the holder 20 and connected to each other. Preferably, the clip element 30 and the cover 10 are formed to hold the holder 20 between them in the longitudinal direction on the cover 10.

Preferably the cover 10, the intermediate connecting element 13, the holder 20 and the clip element 30 are formed in such a way that in the interior space 15 of the cover 10, first the intermediate connecting element 13 is inserted into the cover 10, then the holder 20 onto the intermediate connecting element 13 and then the clip element 30 onto the holder 20 and connected to each other.

Preferably, the clip element 30 is made of a more flexible material than the holder 20 and/or is designed with a flexible geometry, for example by means of slots or spring-armed webs, as shown in an exemplary manner in FIGS. 7A and 7B.

Preferably, the second end section has a non-circular grip surface on the outside, so that the cover 10 can be manually held and rotated on it in a non-slip manner in order to allow to release it safely from the bottom receptacle 14.

Preferably the channel in the holder 20 for holding the implant extension 2 is designed to be at least so stable that it can withstand at least one bending moment by the implant extension 2 in the final position, which occurs when the implant 1 is separated from the implant extension 2 by a bending break-off. According to the invention, the term "separable" or "separating" includes any type of separating, such as by breaking off or twisting off.

FIG. 9, FIGS. 10A and 10B, and FIGS. 11A-11D show further preferred embodiments of the cover 10, the holder 20 and the clip element 30, wherein the cover 10 has as one-piece a cover wall 10a which is directly connected to a clip housing wall 30a of the clip element 30. The cover wall 10a is formed to run substantially parallel to the longitudinal axis in a connecting section between the cover wall 10a and the clip housing wall 30a. The expression substantially means a parallelism of +/−1°, so that a correspondingly small conicity can be provided for when these parts match another. With a conicity of less than 1°, the clip housing wall 30a can preferably be pushed more easily into the outer cover wall 10a when a first section is inserted.

Due to the substantially parallel course of the cover wall in the connection region, the clip element 30 is guided in the connection region when assembled with the cover 10 when inserted into it. Preferably, at least 50% of the cover wall 10a is exposed on an opposing side to the clip housing wall 30a in the connection section in order to be able to expand outwards without, for example, striking other parts of the cover 10 or the bottom receptacle 14. Preferably, the cover wall 10a is formed in such a way that when the clip element 30 is inserted during assembly, it can expand to such an extent that the clip element 30 is pushed in with the clip housing wall 30a and then sits without wiggle. Preferably, the cover wall 10a and the clip element 30 are formed with a latch or snap connection to each other in the connection region. The latch or snap connection is preferably formed barbed shaped. Preferably, the cover wall 10a and the clip housing wall 30a is formed barbed shaped or snap-fit shaped in such a way that the clip element 30 can be inserted into the cover more easily than pulled out. Preferably, the clip housing wall 30a in the connection region with the cover wall 10a is formed correspondent or exactly fitting or press fitting and in this case preferably cylindrical. Preferably, also a part of the latch or snap connection is integrated, for example as a constriction or protrusion. Preferably the connecting section has a length of 5-10 mm or longer.

Preferably, the cover 10 and the clip element 30 are formed in such a way that a connection is created between them during assembly, substantially between the cover wall 10a of the cover 10 and the clip housing wall 30a of the clip element 30, which can be inserted into each other. The cover wall 10a is preferably of cylindrical shape towards the longitudinal axis. The clip housing wall 30a is preferably of cylindrical shape in the radial outward direction from the longitudinal axis. The cover wall 10a preferably has an inner diameter which substantially corresponds to an outer diameter of the clip housing wall 30a radially outwards from the longitudinal axis, so that it can be pushed into one another with a predetermined amount of force.

Preferably, on an opposing side to the cover wall 10*a*, i.e. towards the holder 20, running substantially parallel to the longitudinal axis, the clip housing wall 30*a* is formed with a further connecting section. The clip housing wall 30*a* is preferably formed to act as a guide bushing for the holder 20 in the further connecting section. The holder 20 preferably has a holder housing wall 20*a*, which is formed to run substantially parallel to the longitudinal axis and, at least in the further connecting section, to complement the clip housing wall 30*a*. The holder housing wall 20*a* is preferably cylindrical or tubular. The expression substantially means here a parallelism of +/−1°, so that a correspondingly small conicity can also be provided at fitting of these parts. Preferably, the further connection region has a further length of 5-10 mm or longer.

Preferably, the clip housing wall 30*a* and the holder housing wall 20*a* have a latch or snap connection in the further connection region. The material thickness of the clip housing wall 30*a* is preferably such that the clip housing wall 30*a* can expand sufficiently easily to be able to expand into the latch or snap connection to the cover 10 and/or the holder 20. Preferably the clip housing wall 30*a* and the corresponding holder housing wall 20*a* are formed in such a way that the clip housing wall 30*a* can be pushed axially onto the holder housing wall 20*a*. Preferably, the holder housing wall is designed cylindrical, but it is also conceivable that it has a rotation preventing cross-section, which is star-shaped, polygonal, rectangular or star-shaped, for example. Preferably, the clip housing wall 30*a* can be inserted between the inner holder housing wall 20*a* and the cover wall 10*a* during assembly.

Preferably, the holder housing wall 20*a* is formed in such a way that the holder housing wall 20*a* in an assembled state extends to the region in an interior space of the clip element 30 where the clip element 30 tapers in a radial direction towards the longitudinal axis. For that matter, the holder housing wall 20*a* stabilizes one seat of the cover 10 with the clip element 30 and the holder 20, so that they sit wiggle-proof. The clip housing wall 30*a* and the holder housing wall 20*a* are preferably formed in such a way that there is a gap between them, with a gap width smaller than that between the clip element 30 and the holder 20 in the assembled state, there existing an angular play of the corresponding longitudinal axes of 1° or more preferably of 0.5°.

For the sake of clarity, the features "above" and "below" are understood to mean relative locations in a vertical direction, as shown in the figures. Apical refers to a position that is located in the bone and further away from the abutment or tooth attachment than a coronal end. Sometimes apical is also understood to be distal and coronal is understood to be proximal to the dentist, in the case of an inserted dental implant 1.

Other possible embodiments are described in the following claims. In particular, the various features of the embodiments described above can also be combined with one another, provided they are not technically mutually exclusive.

The reference signs mentioned in the text above and in the claims serve only for better comprehensibility and do not limit the claims in any way to the shapes represented in the figures.

LIST OF REFERENCE SIGNS

1 dental implant
1*a* apical end
1*b* coronal end
1*c* adapter connection
2 implant extension (appendix)
3 first region
4 second region
5 splined shaft section
6 constriction
7 groove
8 first wedges (preferably circular segments)
8*a* first hubs
9 second wedges
9*a* second hubs
10 cover
10*a* cover wall
10*b* cover end cap
11 first end section
12 second end section
13 intermediate connecting element
14 bottom receptacle part
14*a* third end section
14*b* fourth end section
15 interior space
20 holder for the implant
20*a* holder housing wall
21 third wedges
22 third hubs
30 clip element
30*a* clip housing wall
31 spring arm
31*a* outer first end
31*b* outer second end
32 nub (or nose-like bulge)

The invention claimed is:

1. A receptacle for a dental implant including an implant extension, said receptacle comprising:
   a cover which is formed along a longitudinal axis, the cover including a first end section which is open to an outside in a direction of the longitudinal axis and a second end section which is closed to the outside, wherein the cover surrounds an interior space which is open to the first end section and in which a holder is arranged along the longitudinal axis, the holder including a channel which is open to the outside along the longitudinal axis, the channel being formed to partially receive and to hold the implant extension during transport; and
   a bottom receptacle formed tubularly along the longitudinal axis, the bottom receptacle including an outer third end section and an opposing fourth end section, the third end section being sealed tightly to the outside, the fourth end section of the bottom receptacle and the first end section of the cover being interconnectable and manually detachable to form a substantially gas and liquid tight space therebetween;
   wherein:
      at least three spring arms are formed and arranged in the interior space surrounded by the cover towards the longitudinal axis in such a way that the at least three spring arms are each connected to the cover at an outer first end along an annular region around the longitudinal axis and are equally spaced and resilient radially towards the longitudinal axis with a respective opposing second end,
      each respective opposing second end towards the longitudinal axis includes a nub formed to engage a groove formed annularly on the implant extension when the implant extension is in a final position;

the at least three spring arms are designed geometrically and so flexible that each nub is configured to:
be pushed away from the longitudinal axis during insertion of the implant extension, and
in the final position, push into the groove with a clamping force perpendicular to the longitudinal axis;
the holder is formed as a bushing separate from the cover;
the bushing includes a plug connection towards the cover; and
the plug connection can be pushed into the cover along the longitudinal axis to thereby form a rotationally fixed connection.

2. The receptacle according to claim 1, wherein:
the holder is connected to the cover in a rotationally fixed manner around the longitudinal axis, and
the channel includes along the longitudinal axis at least in sections an anti-rotation section or splined hub section which is designed to form a rotationally fixed connection with an implant anti-rotation section or splined shaft section of the implant extension in the final position.

3. The receptacle according to claim 2, wherein:
the anti-rotation section or splined hub section of the holder has greater torsional stability to hold the implant anti-rotation section or splined hub section of the implant extension than is necessary to break off the implant away from the implant extension by rotational movement around the longitudinal axis; and/or
the torsional stability between the anti-rotation section or splined hub section of the holder and the implant anti-rotation section or splined shaft section of the implant extension is greater than 25 Ncm or greater than 20 Ncm.

4. The receptacle according to claim 1, wherein:
the channel includes, along the longitudinal axis, at least in sections, an anti-rotation section or splined hub section which is designed to form a rotationally fixed connection with an implant anti-rotation section or splined shaft section of the implant extension in the final position, and
a torsional stability of the plug connection is greater than a torsional stability of the rotationally fixed connection between the anti-rotation section or splined hub section of the holder and the implant anti-rotation section or splined shaft section of the implant extension.

5. The receptacle according to claim 4, wherein the plug connection between the holder and the cover comprises a separate intermediate connection element which is formed along the longitudinal axis in such a way that, when the two are plugged together along the longitudinal axis, a rotationally fixed connection to the holder is formed at one end section and a rotationally fixed connection to the cover is formed at an opposing end section.

6. The receptacle according to claim 1, wherein:
the at least three spring arms are formed in one piece as a clip element which is formed around the longitudinal axis, and
the clip element can be connected to the cover in the direction of the longitudinal axis and is then connected to each other in a tension-resistant manner.

7. The receptacle according to claim 6, wherein:
the cover, the holder and the clip element are designed in such a way that in the interior space of the cover, first the holder is inserted into the cover and then the clip element is placed onto the holder and are connected to each other; and/or
the cover, an intermediate connecting element thereof, the holder and the clip element are designed in such a way that in the interior space of the cover, first the intermediate connecting element is inserted into the cover, then the holder is inserted onto the intermediate connecting element and then the clip element is inserted onto the holder and are connected to each other; and/or
the clip element is designed to form a direct connection with the cover, the clip element thereby fixing the holder in the cover along the longitudinal axis.

8. The receptacle according to claim 6, wherein the clip element is formed from a more flexible material or with a more flexible geometry than the holder.

9. The receptacle according to claim 6, wherein:
the cover is formed in one piece with a cover wall which is in direct connection with the clip element,
the cover wall extends substantially parallel to the longitudinal axis in a connecting section to the clip element, in order to guide the clip element when mounted with the cover when inserted therein, and
at least 50% the cover wall is exposed on an opposing side to the clip element in the connecting section in order to be able to expand outwards without striking.

10. The receptacle according to claim 9, wherein the connecting section of the cover wall towards the clip element includes a latch or snap connection.

11. The receptacle according to claim 1, wherein the second end section includes a non-circular grip surface on the outside, so that the cover can be manually held and rotated in a non-slip manner in order to release the cover from the bottom receptacle.

12. The receptacle according to claim 1, wherein the channel in the holder for holding the implant extension is designed to be at least so stable that it withstands at least one bending moment by the implant extension in the final position, which occurs when the implant breaks away from the implant extension by a bending break-off.

* * * * *